March 18, 1930.   J. A. STEELE ET AL   1,751,111
HEADLIGHT VISOR
Filed Aug. 23, 1928
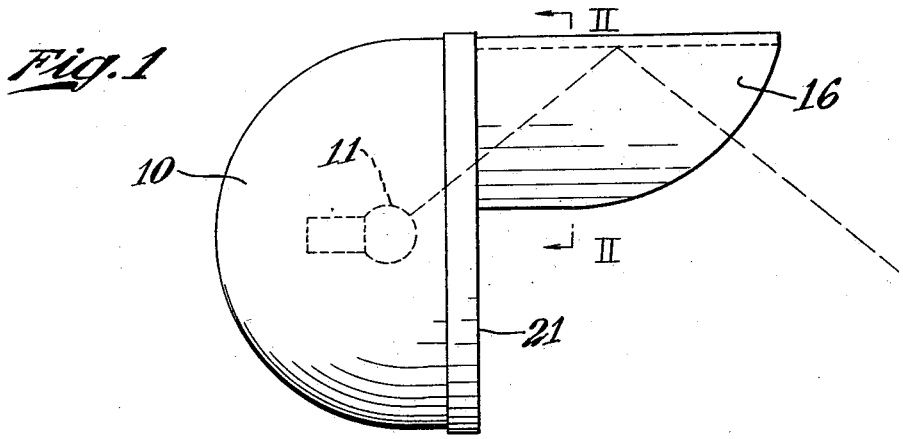
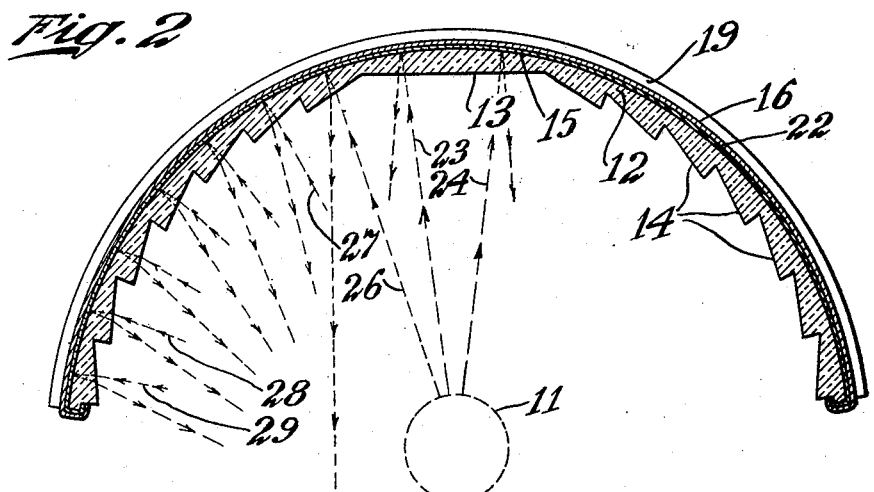
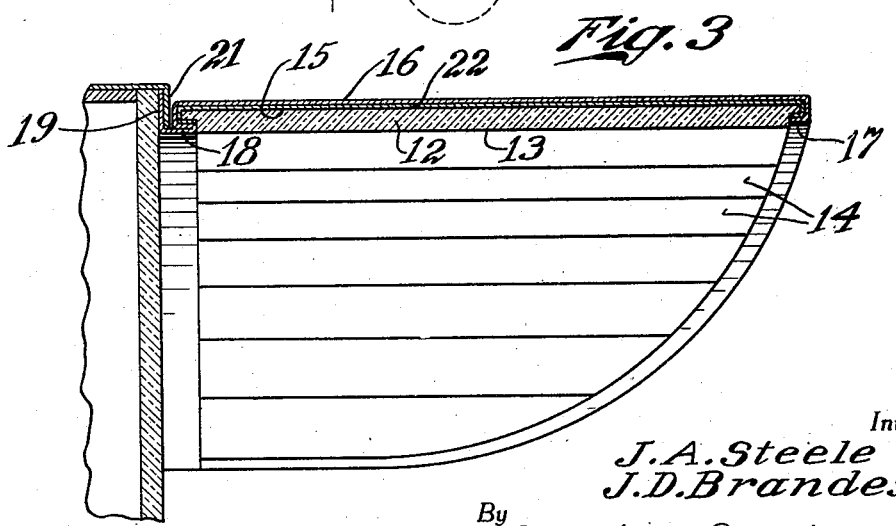
Inventors
J. A. Steele
J. D. Brandes
By Johnston & Jennings
Attorneys Patented Mar. 18, 1930

1,751,111

UNITED STATES PATENT OFFICE

JAMES A. STEELE AND JOSEPH D. BRANDES, OF BIRMINGHAM, ALABAMA

HEADLIGHT VISOR

Application filed August 23, 1928. Serial No. 301,572.

Our invention relates to headlight visors of the type employed to reflect light from automobile headlights downwardly onto the road and prevent upward glare of the headlights from blinding persons approaching the vehicle on which the headlights are mounted, and has for its object the provision of apparatus of the character designated which shall be effective to cause a greater proportion of light rays to be reflected downwardly on the road.

A more specific object of our invention is to provide a headlight visor wherein rays projected upwardly from the headlights are refracted, reflected and again refracted so that they are finally turned downwardly onto the road directly ahead of the automobile.

It is well recognized that glaring automobile headlights, where a glare from such headlights is permitted to be directed upwardly from the road, are a great danger, due to their temporary blinding effect on meeting motorists. Numerous devices have been proposed for obviating this difficulty, among which are visors which intercept upwardly directed rays and reflect a portion of them downwardly.

While an ordinary reflecting visor is useful in minimizing headlight glare, a large proportion of the light rays are so reflected as to greatly scatter or diffuse over too wide an area directly in front of the vehicle and thus fail to give that concentration of light directly in front which is so necessary to the operator of the vehicle in order that he may discern objects and rough places in the road directly ahead of him. The reason for this wide diffusion of light resides in the fact that the majority of headlight lenses are circular and the visors are made with a curvature conforming to the headlight lenses so that the divergent light rays from the headlight bulb are reflected back from the visor directly through the center of curvature of the visor. Thus light rays striking the lower portions of the visor are reflected across through the center of curvature and toward the opposite side of the road.

In accordance with our invention we have provided a refracting and a reflecting means whereby light rays striking the sides of the visor are refracted and reflected and again refracted so that they are concentrated downwardly on the road ahead of the vehicle and are not reflected so widely to the sides of the road and so widely diffused as is the case with an ordinary curved reflecting visor. Our invention comprises a glass member suitably mounted to overhang the headlight and molded to form a series of parallel forwardly projecting prisms with a reflecting surface at the rear thereof. The glass in the top of the visor is molded to form a horizontal flat surface so that the light striking said surface is reflected by the silvered surface behind it directly downwardly on the road.

Apparatus embodying features of our invention is illustrated in the accompanying drawings, forming a part of this application, wherein Fig. 1 is a side elevation of a headlight equipped with our improved visor;

Fig. 2 is a transverse sectional view taken along the line II—II of Fig. 1, and drawn to a larger scale; and Fig. 3 is a longitudinal sectional view of the visor.

Referring to the drawings for a better understanding of our invention, we show an automobile headlight 10, having the usual light bulb 11 and equipped with our improved visor.

Our improved visor comprises a glass portion 12 which is preferably molded in the desired shape. Along the upper part of the visor the surface which the light rays strike is horizontal and flat as at 13. Extending downwardly from each side of the flat surface 13 are a series of forwardly extending prisms 14 having their thicker portions at the lower sides thereof.

The rear side of the glass portion is curved and silvered as shown at 15 to form a reflector. The glass portion 12 is mounted in a metallic frame 16 having a front flange 17 bent downwardly over the glass and a rear flange 18 similarly bent over the glass portion 12 to hold it in place. The metallic frame is then bent rearwardly and upwardly to form a flange 19 which is adapted to fit under the front flange 21 of the headlight frame and thus serves to hold the visor in place. Between the glass portion 12 and the frame 16 is a rubber pad 22 which minimizes vibration of the glass portion and prevents its being broken by vibration.

By referring to Fig. 2 of the drawing, it will be seen that upwardly diverging light rays from the bulb 11, as at 23 and 24 which strike the flat surface 13 are reflected by the silvered surface behind it directly downwardly on the road. Light rays which strike the prisms 14 as shown by the arrows 26 and 27 are first refracted on entering the prisms, toward the lower side of the prisms, are then reflected back to the outer surface of the prism, and finally are again refracted downwardly so as to be projected directly onto the road. Rays of light striking the lower sides of the visor as at 28 and 29 are likewise refracted, reflected and again refracted, as shown by the arrows, so that there is a concentration of light downwardly rather than a diffusion of light.

While we have shown our invention in but one form, it will be obvious to those skilled in the art that it is not so limited, but is susceptible of various changes and modifications without departing from the spirit thereof, and we desire therefore that only such limitations shall be placed thereupon as are imposed by the prior art, or as are specifically set forth in the appended claims.

What we claim is:

1. A headlight visor comprising glass molded to provide a series of forwardly extending prisms, and a reflective backing for the prisms, said prisms being so arranged that the light passing therethrough from the headlight is refracted downwardly from the visor.

2. A headlight visor comprising glass molded to form a plurality of parallel forwardly extending prisms overhanging the front of the headlight frame with the thicker parts of said prisms being the lower sides thereof, and a reflecting medium backing said prisms.

3. A headlight visor as set forth in claim 2 in which the rear surface of the glass is curved and silvered to provide a reflector.

4. A headlight visor comprising a glass portion molded to form a plurality of parallel forwardly extending prisms overhanging the front of the headlight frame with the thicker parts of said prisms disposed downwardly, the rear of said glass portion being curved and silvered to provide a reflecting surface, a frame in which the glass portion is mounted, and means for securing the frame for the glass portion to the headlight frame.

5. A headlight visor comprising a glass portion molded to form a plurality of parallel forwardly extending prisms overhanging the front of the headlight frame with the thicker parts of said prisms disposed downwardly, the rear of said glass portion being curved and silvered to provide a reflecting surface, a frame in which the glass portion is mounted, and a resilient cushion between the glass portion and the frame.

6. A device as set forth in claim 4 in which the glass is molded to provide a flat surface along the top of the visor on the side exposed to the source of light and the parallel prisms extending forwardly along the sides.

In testimony whereof we affix our signatures.

JAMES A. STEELE.
JOSEPH D. BRANDES.